3 Sheets--Sheet 1.
D. LOCKHEAD.
Mowing-Machine.
No. 165,453.　　　　　　　　　　Patented July 13, 1875.
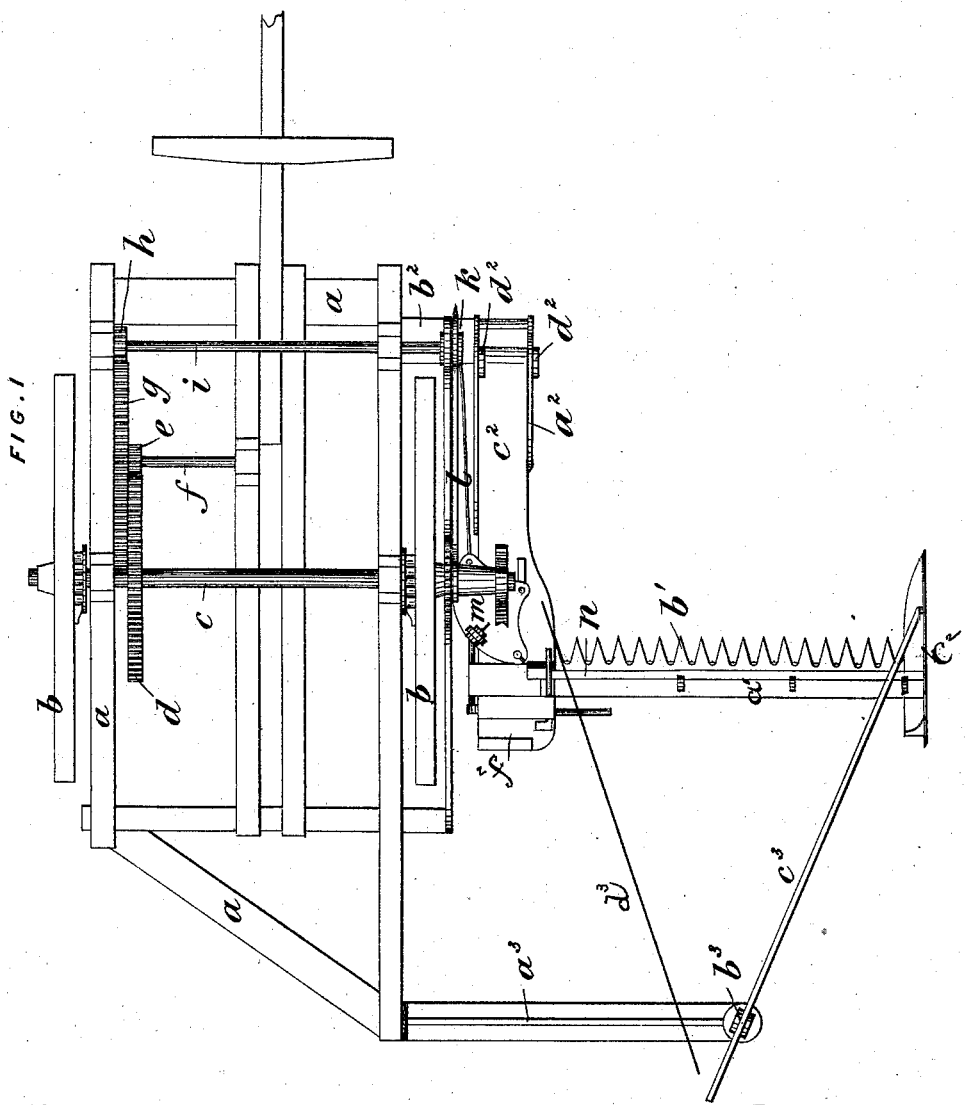
Witnesses:
C. G. C. Simpson
Robt. Kellond
Inventor:
David Lockhead

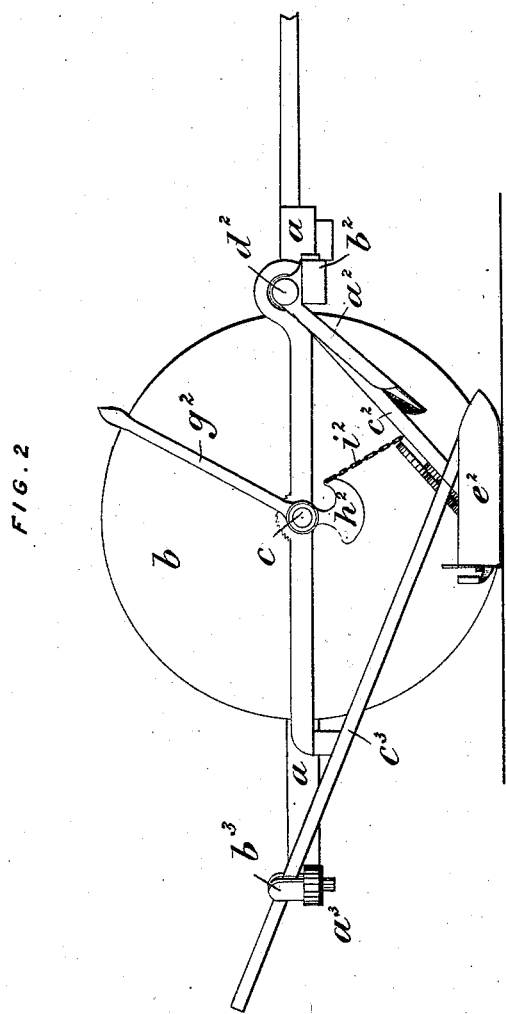

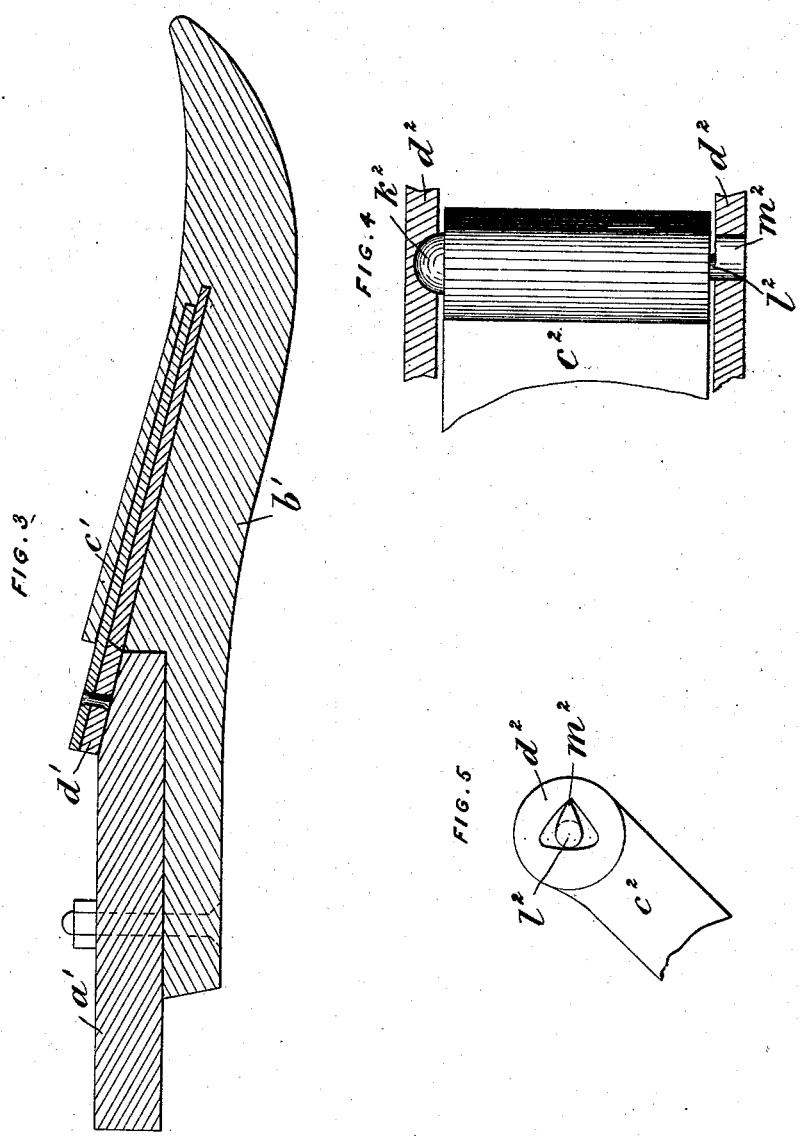

UNITED STATES PATENT OFFICE.

DAVID LOCHHEAD, OF HOCHELAGA, CANADA.

IMPROVEMENT IN MOWING-MACHINES.

Specification forming part of Letters Patent No. 165,453, dated July 13, 1875; application filed March 14, 1874.

*To all whom it may concern:*

Be it known that I, DAVID LOCHHEAD, of the village of Hochelaga, in the county of Hochelaga, in the Province of Quebec, Canada, farmer, have invented new and useful Improvements on Mowing-Machines, Reaping-Machines, and Combined Mowing and Reaping Machines; and I do hereby declare that the following is a full, clear, and exact description of the same.

This invention may be subdivided into parts as follows: First, an improvement in the arrangement of the axis upon which the frame carrying the cutters is attached to the main body of the machine; second, an improved rail or rails for causing the crop cut to fall toward each other, and thereby form it into a ridge instead of having it spread equally all over the ground or in the proportion it grew in.

In the drawings herewith annexed similar letters of reference indicate like parts.

Figure 1 represents a plan of a combined mowing and reaping machine embodying my invention. Fig. 2 represents a side elevation of Fig. 1. Fig. 3 represents a detail, showing improved arrangement of cutter. Fig. 4 represents a detail of axis attaching the frame carrying the cutters, shown in the position of plan. Fig. 5 represents a side elevation of Fig. 4.

Letter $a$ is the frame of the machine, of any of the ordinary constructions, or as shown in the drawings. $b$ are the ground-wheels, also made in the usual way, and provided with the ordinary axle $c$, revolving with them. On this is secured a spur-gear wheel, $d$, intermeshing with a pinion, $e$, secured on an intermediate shaft, $f$, on which is also secured a spur-gear wheel, $g$, intermeshing with a pinion, $h$, attached on a shaft, $i$, all as shown in Fig. 1. These spur-wheels and pinions will be so arranged with regard to size to cause the shaft $i$ to perform as many revolutions as the cutters, hereinafter described, are required to make strokes—that is to say, to pass one way and to return the other—while the ground-wheels $b$ are performing one revolution. On the end of the shaft $i$, at $k$, is attached a crank or other similar device for imparting motion by means of a rod, $l$, to any suitable bell-crank, $m$, having its other extremity connected in the ordinary manner with the cutter-bar $n$.

The spur-wheels, pinions, &c., are not necessarily placed on the side of the machine, (shown in the drawings,) as it is obvious that they may be placed in any other position, if desired; but I prefer to place them as shown, to counterbalance or distribute the weight as far as possible and equalize the draft.

The cutters are arranged to stand at an angle to the surface of the ground. This is shown most clearly in Fig. 3, where $a^1$ is the main bar, to which the fingers $b^1$ are attached in the ordinary way, with the exception that they are arranged to provide for the inclination of the cutter $c^1$ attached to the cutter-bar $d^1$, in the ordinary way. In fact all these parts may be constructed in any of the forms heretofore in use, saving the necessary alterations involved by setting the cutters obliquely. The angle at which the cutters are set is about twenty-five horizontal—seventy-five degrees from a vertical.

The object of this inclination is to place the cutters more generally at right angles to the stalk of grain or hay to be cut, and will be found of immense advantage in cutting what is generally understood by fallen grain or hay—that is to say, that has been beaten down by stormy weather or other causes—in which case it is desirable, as far as convenient, to work this machine in the direction it is fallen, although the machine may be worked in any direction if necessary.

The cutter-bar is attached to an arm so pivoted to the main body of the machine that the cutter-bar will be placed at a suitable distance behind the point of attachment, and not immediately, or nearly immediately, below it, as heretofore.

By this arrangement the frame is enabled to swing and accommodate the inequalities of the ground when the body of the machine is caused to lurch, and prevents the frame and cutter-bar from striking or jarring heavily on such occasions, thereby saving the wear and tear of the machine.

$a^2$ is a chair securely attached to the cross-beam $b^2$ of the machine. This chair is formed of a bottom plate, with flanges at the sides projecting upward, of suitable dimensions to receive and hold in it the frame $c^2$. The chair is also provided with projections $d^2$, forming the bearing for the axis upon which the frame $c^2$ rotates. The particular construction of this axis will hereinafter be more particularly described. $e^2$ is the shoe at the end of the cutter-bar, provided with the ordinary strap to adjust its elevation. Under the end of the frame $c^2$, at $f^2$, a similar strap is provided to adjust the elevation of the finger-bar $a^1$ toward that end.

It will be seen that, as the machine is moved along, the frame $c^2$, rotating freely on its axis, allows the shoe $e^2$ and the end $f^2$ to accommodate all ordinary inequalities of ground in the longitudinal direction, and it will be hereinafter seen that by my improvements in the attachment at $d^2$ all ordinary inequalities in a transverse direction are provided for. By the lever $g^2$, cam $h^2$, and chain $i^2$, the frame $c^2$, bar $a^1$, and parts thereunto attached, may be lifted clear of the ground, and held in that position by a rack on the frame, and pawl on the lever; also, any of the ordinary arrangements at present in use may be made for turning up the cutter-bar $a^1$, for passing through narrow places, gateways, or along roads, &c.

The upward flanges of the chair $a^2$ protect the axis at $d^2$ from all side or twisting strain, while the bottom is placed at the proper position to limit the extent that the frame can swing downward, while it is free to swing upward any ordinary amount.

I will now proceed to describe the pivot at $d^2$, upon which the frame $c^2$ rotates, referring more particularly to Figs. 4 and 5. The inner projection $d^2$ is formed with a concave recess, while the axis to that side is provided with a convex projection, $k^2$, whereby an ordinary ball-and-socket joint is formed by the two. The axis at the outer projection $d^2$ is formed by a spindle, $l^2$, having a cam projection, $m^2$, made in one with it, as clearly shown in Figs. 4 and 5, and in the outer $d^2$ an opening, $n^2$, of the configuration shown in Fig. 5, to receive the axis.

By this arrangement, whenever the lower end of the frame $c^2$ is raised the cam projection $m^2$ is turned downward, thereby raising the outer side of the frame $c^2$, and with it the bar $a^1$, relieving the same from the undue amount of strain which would otherwise occur. It will also be remarked that a small space exists below the axis $l^2$, when placed level with $k^2$. This is to enable the frame $c^2$ to drop a little downward as well as to cant upward. It must be borne in mind that the flanges at the sides of $a^2$, although made to fit the sides of the frame $c^2$, must be sufficiently loose to allow of this action.

The guides for gathering the crop cut into swaths, now to be described, are more particularly adapted to be used in harvesting grain, to obviate in a great measure the necessity of employing several persons to follow the machine and collect the harvest out of the way of being trampled upon by the horses (or crushed by the machine) when they pass to make the next swath or cut.

For this purpose I provide an arm, $a^3$, attached to the back of the frame $a$, as shown in Figs. 1 and 2, having at its extremity a socket, $b^3$, to receive a rail, $c^3$, attached, as shown, to the shoe $e^2$, such attachment being arranged for easily removing and replacing when desired, while it is, nevertheless, securely held in place. $d^3$ is a similar rail attached to the frame $c^2$ at one end, and provided with a socket similar to $b^3$ at the other. The sockets $b^3$ will be made adjustable by any ordinary means on the arm $a^3$.

These rails, catching the harvest as it is in the act of falling, easily move it inward toward the vertex of the angle formed by them.

What I claim is as follows—

1. The link-frame $c^2$, and chair $a^2$, hinged together on one side by a ball-and-socket joint, $k^2$, on the other side by a cam-shaped pintle, $l^2$ $m^2$, all operating as specified.

2. The finger-bar $a^1$, and supporting-arm $a^3$, in combination with the converging gathering-bars $c^3$ and $d^3$, substantially as specified.

DAVID LOCHHEAD.

Witnesses:
C. G. C. SIMPSON,
R. A. KELLOND.